March 24, 1936.  A. CURIONI  2,035,300
FLOAT VALVE
Filed May 28, 1934
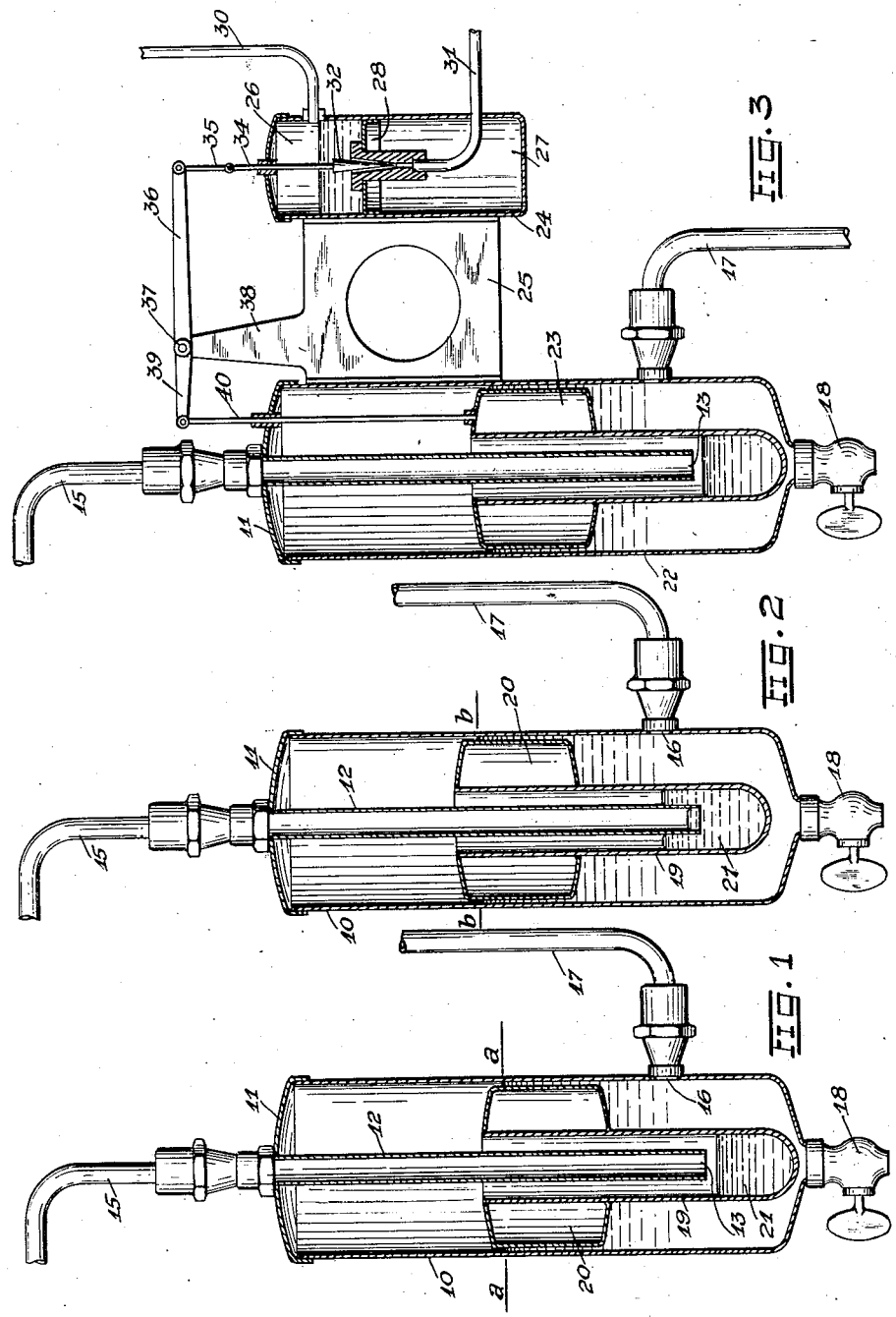
INVENTOR
Aldo Curioni
BY
ATTORNEY Patented Mar. 24, 1936

2,035,300

UNITED STATES PATENT OFFICE 2,035,300

FLOAT VALVE

Aldo Curioni, Yorktown Heights, N. Y., assignor, by direct and mesne assignments, to The Gasolaire Corporation, New York, N. Y., a corporation of New York Application May 28, 1934, Serial No. 727,977

1 Claim. (Cl. 137—68)

This invention relates to liquid feed regulators and more particularly refers to improvements in float valves, adapted to automatically control the level of a liquid in a tank or container.

The idea of maintaining a liquid within a tank at a substantially constant level, by regulating the liquid supply by means of a valve including a float actuated by the liquid itself, is not per se new. A conventional and well known type of float valve, comprises a needle valve actuated by a float, said float causing the valve to open more or less, or to close, according to the variations taking place in the level of the liquid controlled thereby, owing to the inflow or outflow of the liquid from the tank or container.

Float controlled needle valves are extensively used in carburetors and similar appliances where a liquid such as gasoline, for instance, should be admitted to the carbureting chamber in quantities more or less determined by the consumption demand. Needle valves, providing as they do a fine regulation of the liquid supply, have been found satisfactory enough for use in connection with easy flowing liquids, free from impurities. However, I have found that if the liquid to be handled is likely to contain impurities of some sort or other, or to have a relatively high degree of viscosity, a needle valve cannot always be relied upon to regulate the liquid feed in a satisfactory manner.

If the viscosity of the liquid is high, the feed is likely to be sluggish and to lag behind the withdrawals of liquid from the tank; and if the liquid contains impurities of a gummy or solid nature the valve may at times become clogged and cease to function properly.

In the case of heavy oils, such as crude oil and the heavier fractions remaining after distillation of the more volatile components thereof, it is necessary to contend both with a relatively high viscosity and the presence of impurities of a tarry nature.

Accordingly, the primary object of this invention is to provide a float valve of a novel and improved construction, which is very sensitive, and is at the same time positively non-clogging.

Another object is to provide a float valve of a novel and improved design, requiring practically no exact machining operations, and adapted to be produced at relatively low cost.

A further object is to provide a float valve adapted to control the level of a liquid in a tank or container, constructed so as to of itself constitute a complete article of manufacture, insertable like an ordinary fitting in the pipe line supplying liquid to the tank or container.

A still further object is to provide a valve unit, comprising a plurality of valves, each governing the feed of a separate liquid or fluid, at least one of said valves being a float valve and controlling the operation of the remaining valves.

Other objects and advantages of the present invention will more fully appear as the description proceeds and will be set forth and claimed in the appended claim.

My invention is illustrated by way of example in the accompanying drawing, in which:

Fig. 1 is a vertical section of a float valve embodying my invention, in its open position;

Fig. 2 is a similar view showing the valve in its closed position; and

Fig. 3 is a vertical section of a similar valve in combination with an additional valve controlled by the same float.

Referring to Figs. 1, 2, 10 designates the hollow body of the valve made in the form of a vertically elongated cylinder. From top 11 of the valve body and centrally thereof depends a feed pipe 12, the lower end 13 of which is spaced a certain distance from the bottom 14 of valve body 10. Said feed pipe is connected to a supply line 15 and body 10 has an outlet 16, to which can be connected the delivery or feed line 17.

The bottom 14 of body 10 is also preferably equipped with a cock 18 for the removal from time to time of such impurities as might collect at the bottom of the valve body. In order to make it possible for the impurities to so collect at the bottom, outlet 16 is vertically spaced from bottom 14, although its position is naturally below the normal liquid level to be maintained. Said normal level should range between a minimum indicated by line $a$—$a$ in Fig. 1, and a maximum indicated by line $b$—$b$ in Fig. 2.

The valve also includes a float member comprising a trough 19, having a diameter larger than and surrounding the lower portion of feed pipe 12, and an annular chamber 20 surrounding the upper end of said trough, forming the float portion proper. The outer diameter of said chamber 20 is somewhat smaller than the diameter of the chamber formed by body 10, so that said body acts to a certain extent as a guide for the vertical displacements of the float member, while permitting liquid to flow through the annular space intervening therebetween.

The position of the float member is, of course, determined by the level of the liquid within the valve body, which corresponds to the level of the liquid in the tank connected thereto.

The lower part of the trough contains a certain quantity of mercury 21, which leaves the lower end of feed pipe 12 unobstructed when the liquid level is below normal and which acts as a liquid seal preventing the discharge of liquid from said feed pipe, as shown in Fig. 2, when the level of the liquid is above normal. When the float is in the position shown in Fig. 1, liquid supplied through the feed pipe will reach the inside of the trough and flow from the upper end thereof into the chamber of body 10. Impurities or heavy fractions, if any, will fall to the bottom and only clear liquid will be supplied to the tank through delivery line 17.

Owing to its construction, the valve is entirely free of the danger of becoming clogged; furthermore, its operation is very sensitive because when the top of the mercury nears the lower end of feed pipe 12, it will close the outlet thereof in a very gradual manner. It will be observed that the construction of the valve is extremely simple and that no exact machining operations, such as are required for the manufacture of a needle valve, are needed.

In Fig. 3 I illustrate a float valve 22 similar in every way to the valve just described, comprising a float member 23. In addition the valve is associated with another valve, the hollow body of which 24 is shown connected to the body of valve 22 by means of a bracket 25.

Body 24 comprises an upper chamber 26 and a lower chamber 27, separated therefrom by a partition 28, formed with a lug 29 depending therefrom, the supply line 30 being connected to the chamber 26 and the delivery line 31 being connected to the lower end of lug 29.

Communication between chamber 26 and delivery pipe 31 is established by means of a tapering passage 32, provided through lug 29, and an axially movable needle valve 33 can close or more or less open said passage.

Needle valve 33 is provided with an upwardly directed stem 34 connected by a link 35 to the longer arm 36 of a lever pivoted at 37 to an upward extension 38 of bracket 25, the shorter arm 39 of said lever being connected to a rod 40 vertically extending from float 23.

The various parts described are so designed that when the liquid within the body of valve 22 reaches its normal level, needle valve 33 closes passage 32, while said passage will open more or less when the level of the liquid within valve 22 is below normal; so that the feed of the liquid supplied through supply pipe 30 and delivery pipe 31 is also controlled by float 23.

The drawing is intended for illustrative purposes only as the constructional details of the invention obviously can vary from those shown without departing from the spirit thereof. I, therefore, reserve the right to carry my invention into practice in all those ways and manners which may enter, fairly, into the scope of the appended claim.

I claim:

A liquid flow controlling device comprising a vertically elongated hollow body forming a float chamber, a feed pipe vertically extending within said chamber from the upper end thereof, the lower end of said pipe being spaced from the bottom of said chamber, a float having a depending trough having a diameter larger than, and surrounding the lower end of said feed pipe forming an open top annular passage therewith serving as the sole outlet from said trough, said float having a diameter slightly smaller than the diameter of said chamber, a body of mercury at the bottom of said trough, and a delivery outlet for said chamber.

ALDO CURIONI.